United States Patent [19]
Yoshida et al.

[11] Patent Number: 5,305,316
[45] Date of Patent: Apr. 19, 1994

[54] MULTIPLEX COMMUNICATION SYSTEM

[75] Inventors: Kiyoshi Yoshida, Atsugi; Atsushi Sakagami, Yokohama, both of Japan

[73] Assignee: Nissan Motor Co., Ltd., Yokohama, Japan

[21] Appl. No.: 754,043

[22] Filed: Sep. 3, 1991

[30] Foreign Application Priority Data

Sep. 4, 1990 [JP] Japan .............................. 2-232407
Sep. 4, 1990 [JP] Japan .............................. 2-232409
Sep. 18, 1990 [JP] Japan .............................. 2-246239

[51] Int. Cl.$^5$ .............................................. H04J 3/14
[52] U.S. Cl. ................................................ 370/85.1
[58] Field of Search ................... 370/85.1, 24; 307/9.1, 307/10.1

[56] References Cited

U.S. PATENT DOCUMENTS

| | | | |
|---|---|---|---|
| 4,845,708 | 7/1989 | Herrmann, Jr. et al. | 370/85.1 |
| 4,899,338 | 2/1990 | Wroblewski | 370/85.1 |
| 4,908,822 | 3/1990 | Wroblewski | 370/85.1 |
| 4,920,532 | 4/1990 | Wroblewski | 370/85.1 |

FOREIGN PATENT DOCUMENTS 3-136497 6/1991 Japan .

Primary Examiner—Douglas W. Olms
Assistant Examiner—Min Jung
Attorney, Agent, or Firm—Foley & Lardner

[57] ABSTRACT

In a multiplex communication system for transmitting and receiving data between a master station and a plurality of slave stations, the master station comprises a discriminator for collating an important switch information data transmitted from each slave station for reliability improvement. That is, two or more bit switch data transmitted by the slave station are compared with those stored in the master station and determined to be correct on the basis of a perfect bit level match or a bit level majority decision. Further, it is also possible to compare first data transmitted by the slave station with second data transmitted again by the slave station immediately after the first data transmission. Furthermore, it is preferable to change the access sequence from the master station to the slave stations according to power supply modes determined by ignition key switch positions for providing a higher response speed.

5 Claims, 22 Drawing Sheets

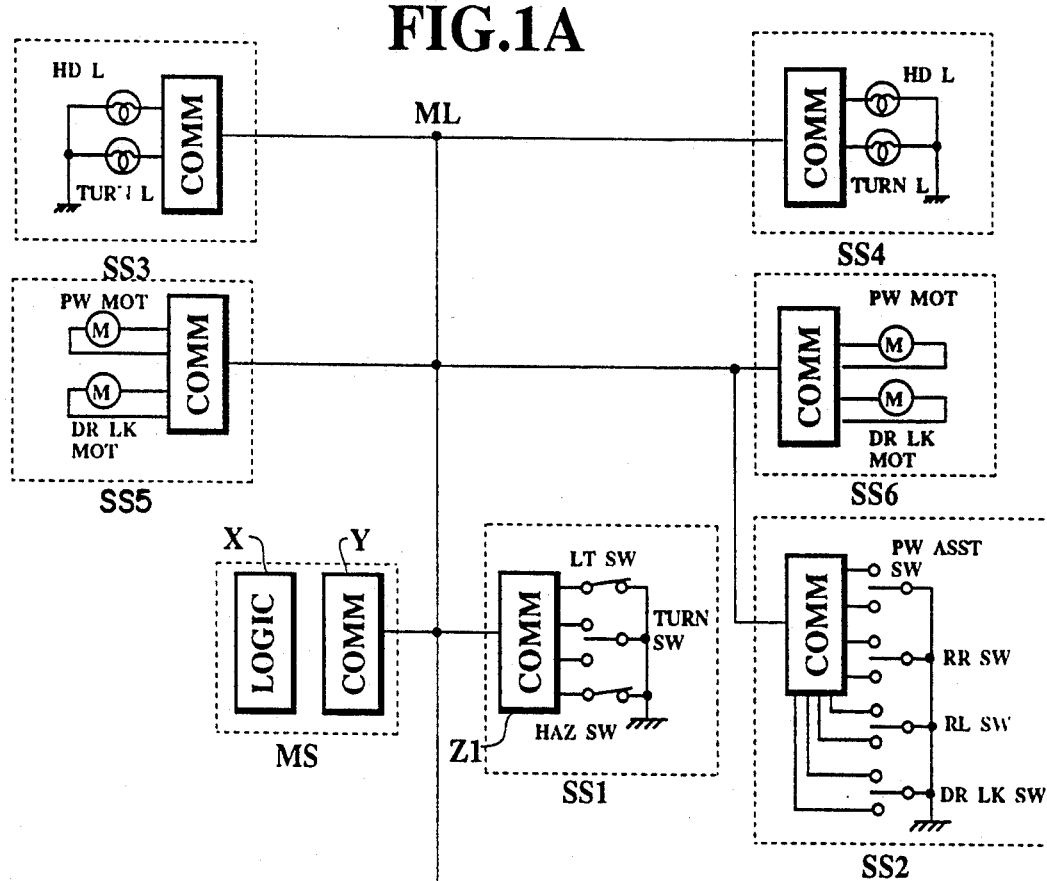
FIG.1A
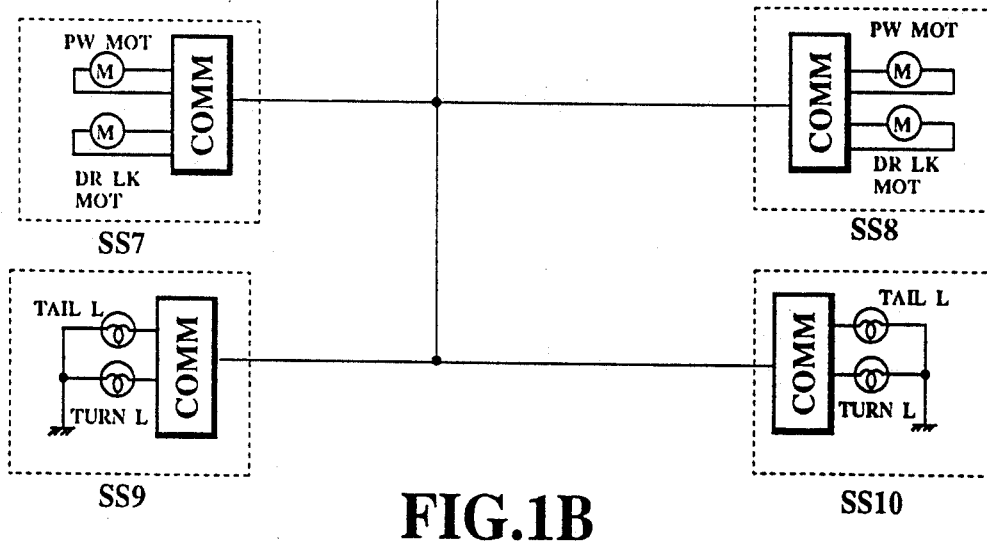
FIG.1B
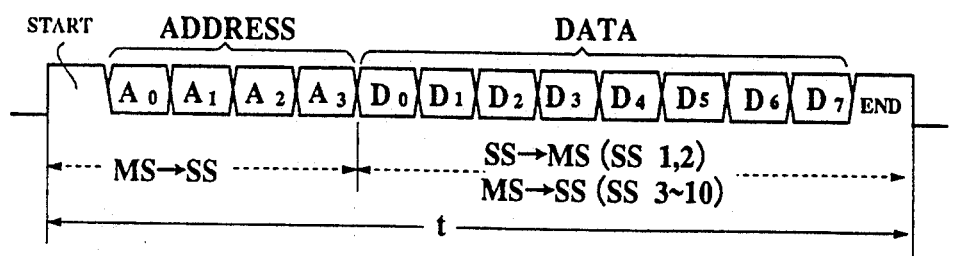

ACCESS SEQ (A)

ACCESS SEQ (B)

ACCESS SEQ (C)

FIG.3B-1

|  | BAT MODE | ACC MODE | ING MODE |
|---|---|---|---|
| SS1 | LIGHT SW<br>HAZARD SW |  | TURN SW |
| SS2 | STEP LAMP<br>DOOR LOCK MOTOR |  | [PW MOTOR] |
| SS3 | [DOOR LOCK SW] |  | PW DR SW<br>PW AS SW<br>PW RR SW<br>PW RL SW<br>PS F/R SW<br>PS F/R INC SW |
| SS4 | STEP LAMP<br>DOOR LOCK MOTOR |  | [PW MOTOR] |
| SS5 |  |  | PS SW<br>PW SW |
| SS6 | STEP LAMP<br>DOOR LOCK MOTOR |  | [PW MOTOR] |
| SS7 |  |  | PW SW<br>PS F/R SW<br>PW FIR INC |

FIG.3B-2

|  | BAT MODE | ACC MODE | IGN MODE |
|---|---|---|---|
| SS8 | STEP LAMP<br>DOOR LOCK MOTOR |  | [PW MOTOR] |
| SS9 |  |  | PS SW<br>PW SW |
| SS10 | HEAD LAMP<br>TURN LAMP |  |  |
| SS11 | HEAD LAMP<br>TURN LAMP |  |  |
| SS12 | TAIL LAMP<br>TURN LAMP |  |  |
| SS13 | TAIL LAMP<br>TURN LAMP |  |  |
| SS14 | [DR DOOR SW] |  | PS F/R MOTOR<br>PS F/R INC MOTOR |
| SS15 | [RR DOOR SW] |  | PS F/R MOTOR |
| SS16 | [AS DOOR SW] |  | PS F/R MOTOR<br>PS F/R INC MOTOR |

FIG.3B-3

|  | BAT MODE | ACC MODE | IGN MODE |
|---|---|---|---|
| SS17 | [RL DOOR SW] |  | PS MOTOR |
| SS18 |  | AIR CON |  |
| SS19 |  | AUDIO |  |
| SS20 |  | AUDIO SW<br>AIR CON SW |  |

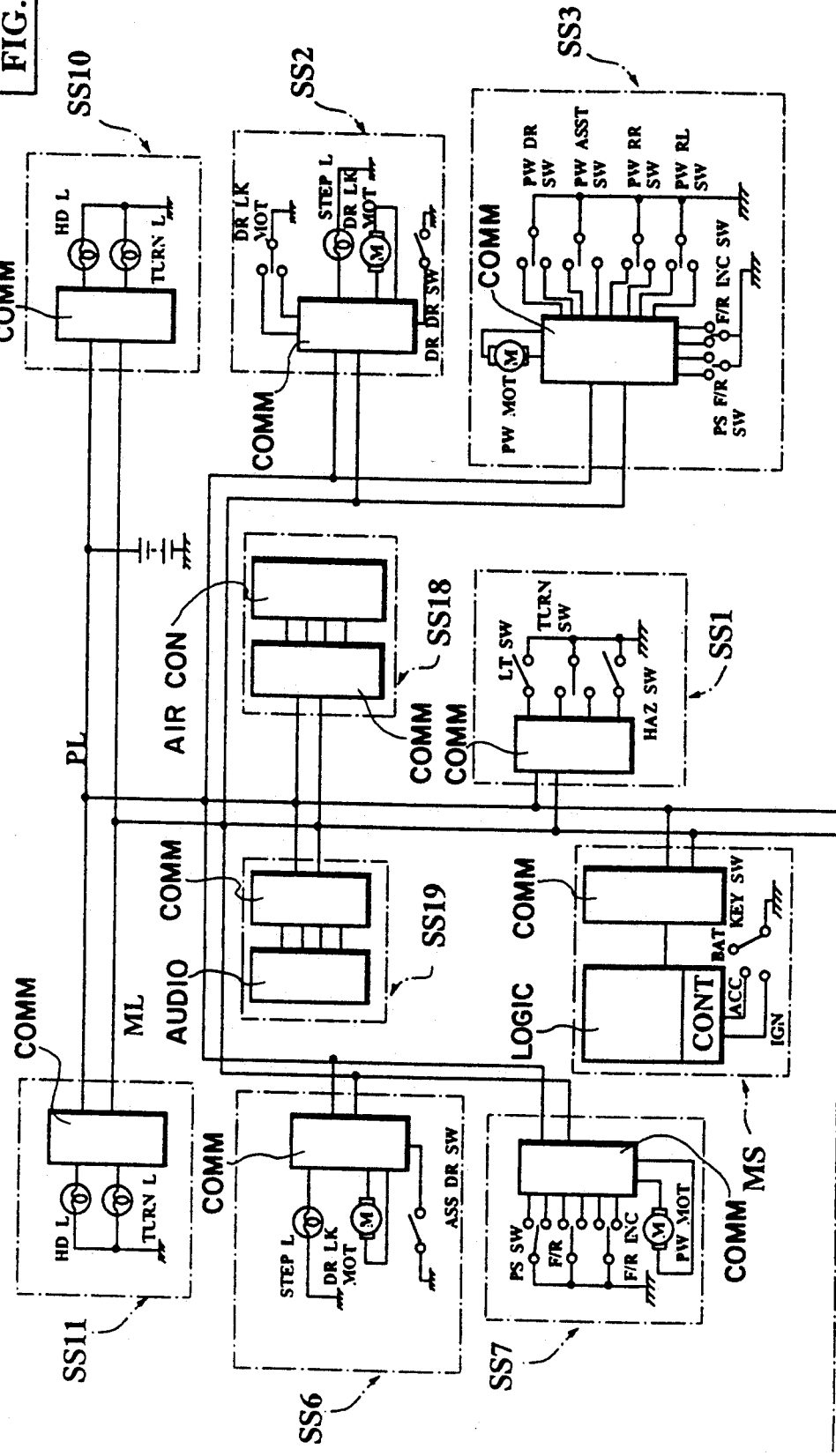

FIG.4B-1

|     | BAT MODE | ACC MODE | IGN MODE |
|-----|----------|----------|----------|
| SS1 | LIGHT SW<br>HAZARD SW | | TURN SW |
| SS2 | (DOOR LOCK SW)<br>STEP LAMP<br>DOOR LOCK MOTOR<br>(DR DOOR SW) | | |
| SS3 | | | (PW MOTOR)<br>PW DR SW<br>PW AS SW<br>PW RR SW<br>PW RL SW<br>PS F/R SW<br>PS F/R INC SW |
| SS4 | STEP LAMP<br>DOOR LOCK MOTOR<br>(RR DOOR SW) | | |
| SS5 | | | PS SW<br>PW SW<br>(PW MOTOR) |

FIG.4B-2

|  | BAT MODE | ACC MODE | IGN MODE |
|---|---|---|---|
| SS6 | STEP LAMP<br>DOOR LOCK MOTOR<br>(AS DOOR SW) | | |
| SS7 | | | PW SW<br>PS F/R SW<br>PS F/R INC SW<br>(PW MOTOR) |
| SS8 | STEP LAMP<br>DOOR LOCK MOTOR<br>(RL DOOR SW) | | |
| SS9 | | | PS SW<br>PW SW<br>(PW MOTOR) |
| SS10 | HEAD LAMP<br>TURN LAMP | | |
| SS11 | HEAD LAMP<br>TURN LAMP | | |
| SS12 | TALL LAMP<br>TURN LAMP | | |

FIG.4B-3

|      | BAT MODE                | ACC MODE                  | IGN MODE                         |
|------|-------------------------|---------------------------|----------------------------------|
| SS13 | TAIL LAMP<br>TURN LAMP  |                           |                                  |
| SS14 |                         |                           | PS F/R MOTOR<br>PS F/R INC MOTOR |
| SS15 |                         |                           | PS F/R MOTOR                     |
| SS16 |                         |                           | PS F/R MOTOR<br>PS F/R INC MOTOR |
| SS17 |                         |                           | PS F/R MOTOR                     |
| SS18 |                         | AIR CON                   |                                  |
| SS19 |                         | AUDIO                     |                                  |
| SS20 |                         | AUDIO SW<br>AIR CON SW    |                                  |

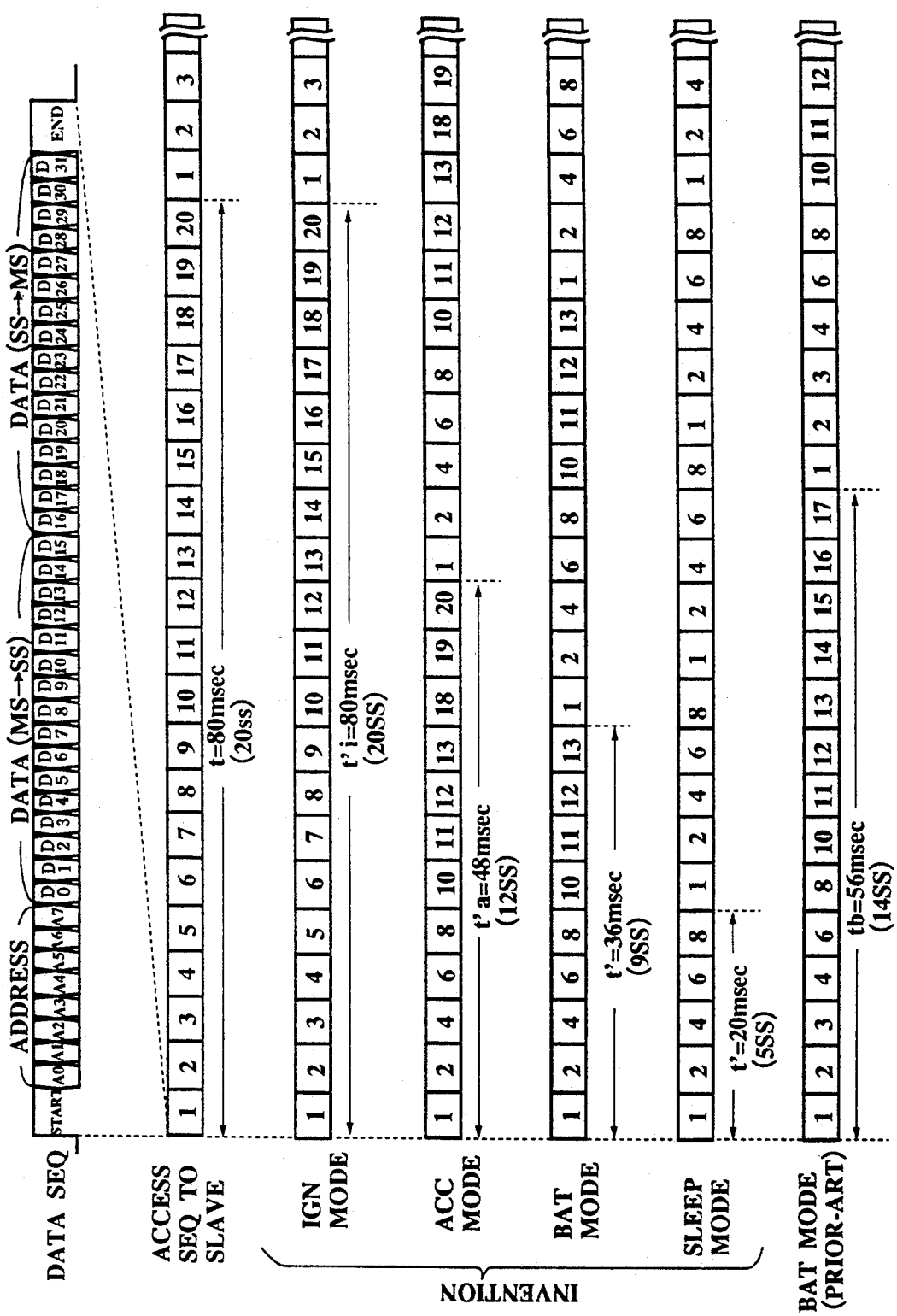

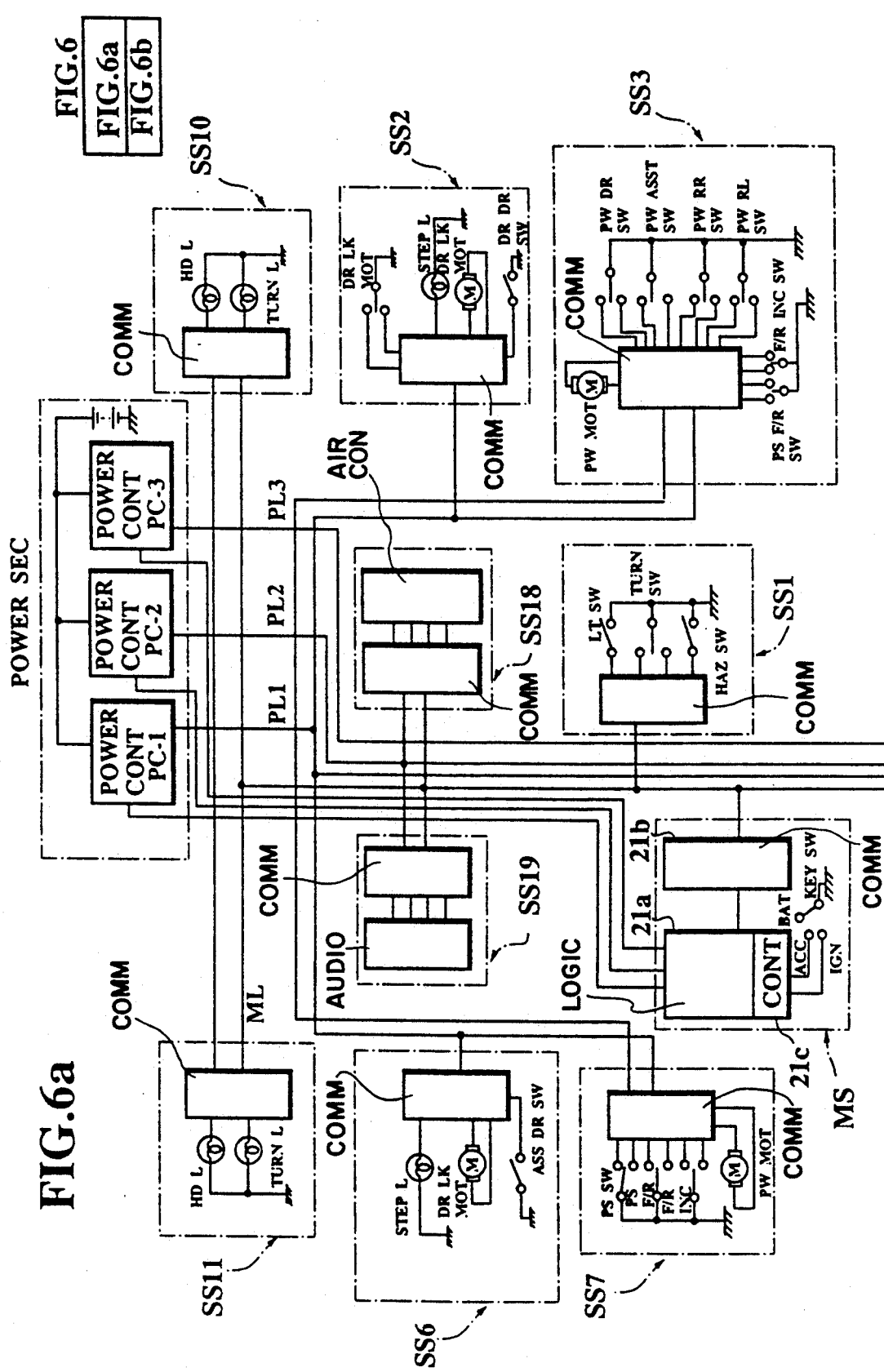

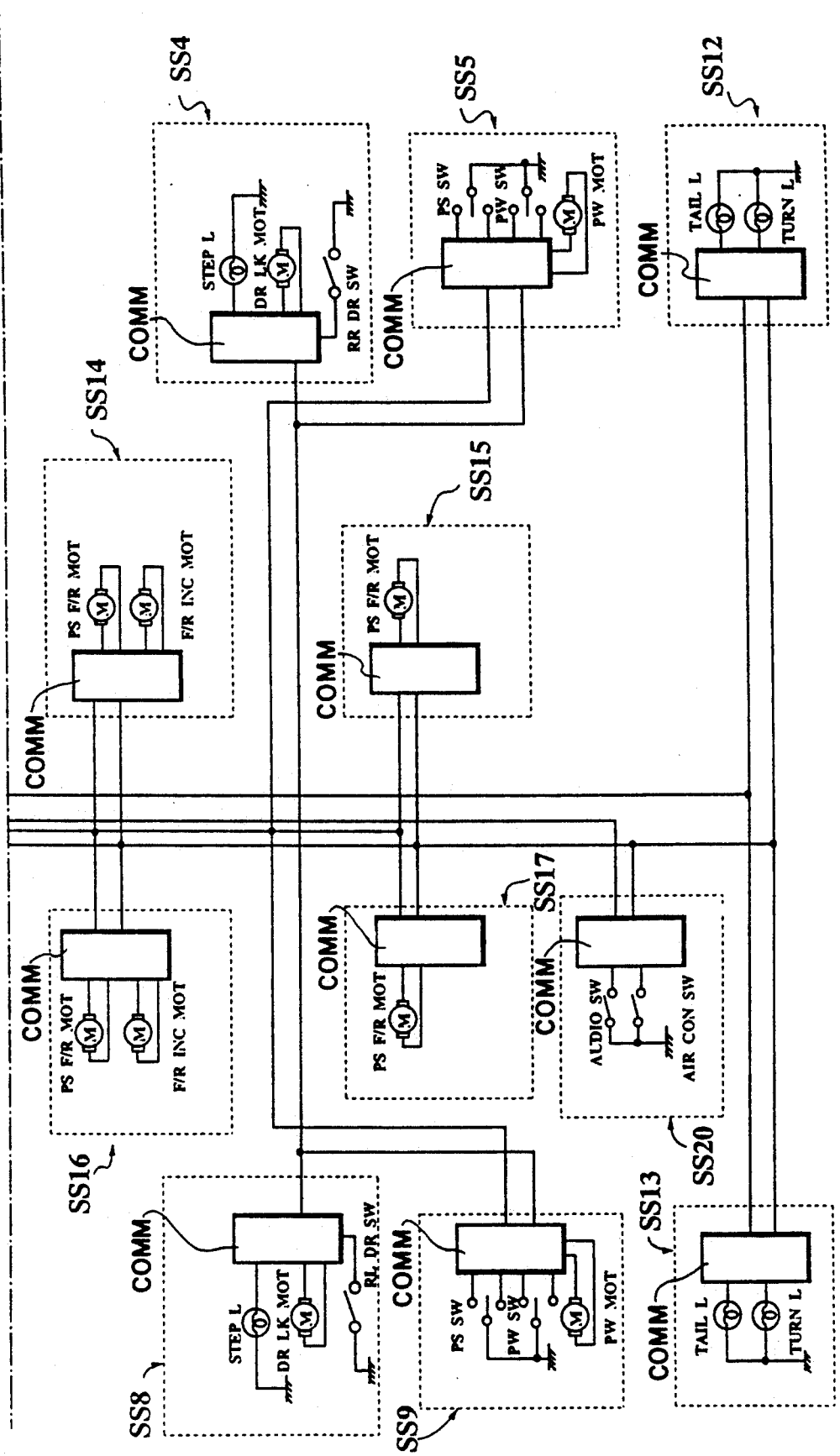

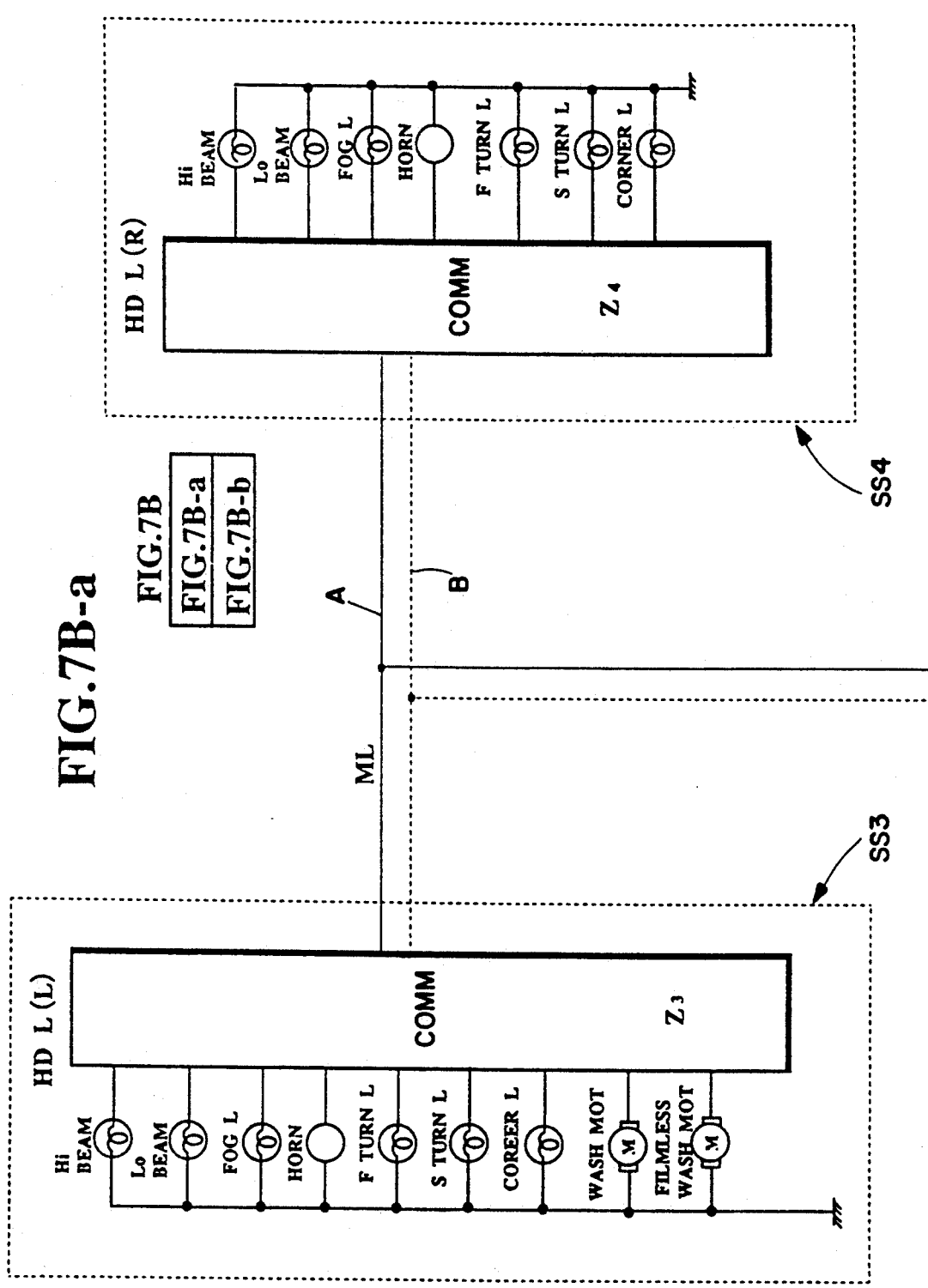

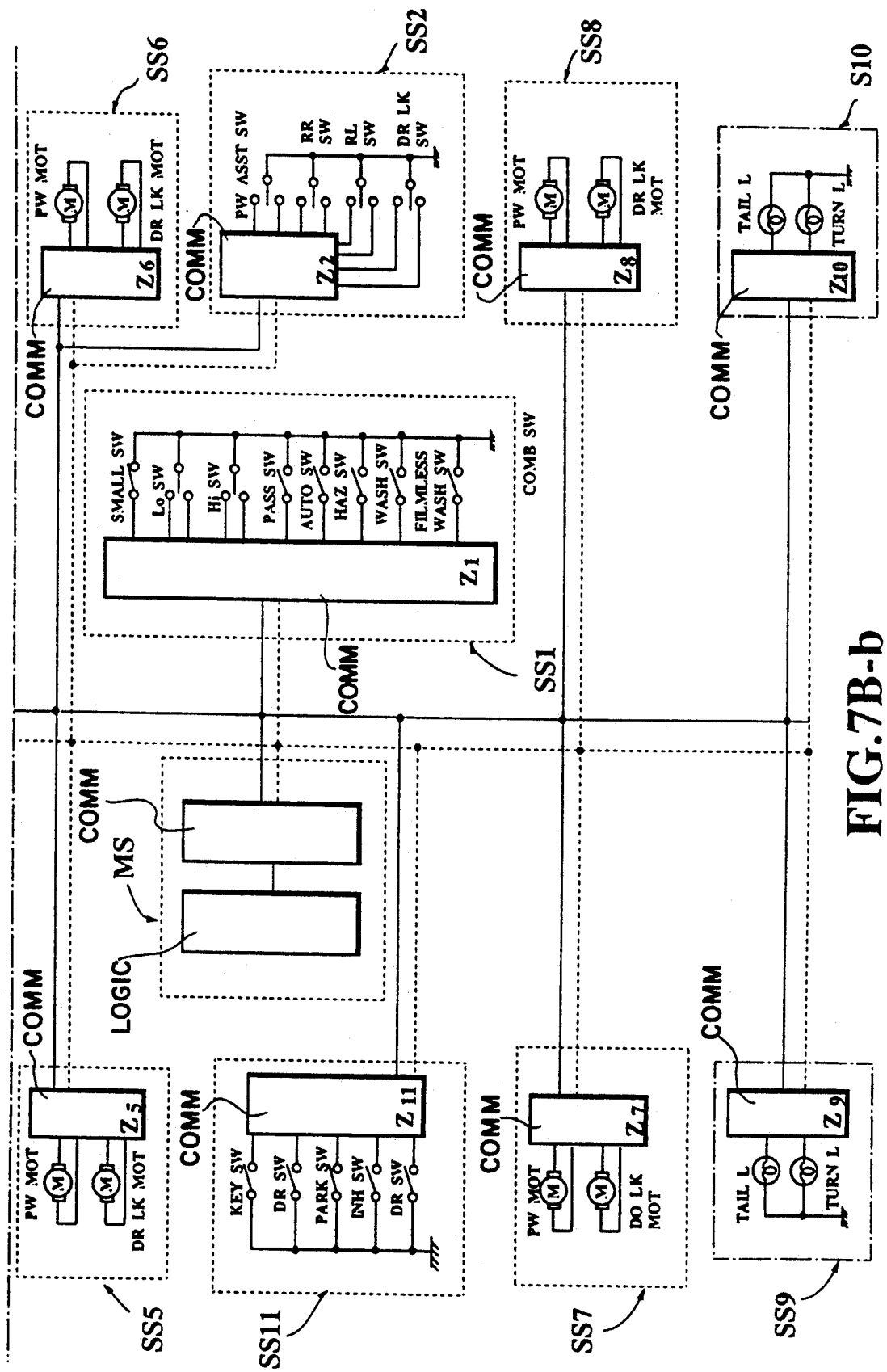
FIG.7B-b

FIG.8A
| HEAD | ADS1 | RX | TX | HEAD | ADS2 | RX | TX | HEAD | ADS3 | RX | TX |
|---|---|---|---|---|---|---|---|---|---|---|---|
| | | 16BITS | 16BITS | | | 8 | 8 | | | 16 | 16 |
FIG.8B
| ADDRESS | ADS 1 | ADS 2 | ADS 3 | ADS 4 | ADS 5 |
|---|---|---|---|---|---|
| SS NAME | COMB SW | PW DR | HEAD LAMP L | HEAD LAMP R | PW ASST |
| BITS | 16/16 | 8/8 | 16/16 | 8/8 | 8/8 |
FIG.8C
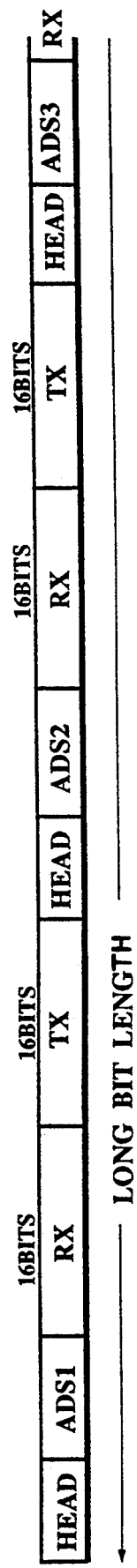
| HEAD | ADS1 | RX | TX | HEAD | ADS2 | RX | TX | HEAD | ADS3 | RX |
|---|---|---|---|---|---|---|---|---|---|---|
| | | 16BITS | 16BITS | | | 16BITS | 16BITS | | | 16BITS |
⎯⎯⎯ LONG BIT LENGTH ⎯⎯⎯→

MULTIPLEX COMMUNICATION SYSTEM

BACKGROUND OF THE INVENTION

1. Field of the Invention

The present invention relates to a multiplex communication system, and in particular to a time division multiplex communication system for an automotive vehicle which can activate a plurality of loads (e.g. headlamps, power window motors, air conditioner, audio apparatus, etc.) by a plurality of switches, respectively via as small a number of transmission lines as possible.

2. Description of Prior Art

In a multiplex communication system for transmitting and receiving data between a master station and a plurality of slave stations via a single transmission line, various loads (lamps, motors, etc.) and switches are distributed in the slave stations, and these loads in the slave stations are activated respectively, whenever the corresponding switches in the slave stations are depressed. In the prior-art system, however, since the switch on-off conditions are read once for each access cycle for all the slave stations, in case a reading error occurs due to noise for instance, there exists a problem in that the load (motor, lamp, etc.) is activated erroneously on the basis of an erroneous data for one access cycle duration.

Further, in the case where the number of slave stations is large, it is preferable to classify the slave stations into a few groups according to power supply modes, that is, according to the ignition key switch positions (BAT, ACC and IGN modes) in the case of an automotive vehicle, in order to improve the response speed. Conventionally, however, since the loads are simply and mechanically allocated to the nearest possible slave stations, even if the slave stations including switches and loads to be activated only in the ACC and IGN modes are not accessed in the BAT mode, there still exists a problem in that many slave stations must be accessed in the BAT mode and therefore the response speed is low. In other words, it is preferable to change the switches and loads to be included in the respective slave stations according to the power supply mode, in order to minimize the response speed.

Further, in the conventional multiplex communication system, the format of the communication protocol is composed of one type of bit length (e.g. 16 bits), there exists a problem in that each item of communication data is long in bit length, so that the transmission efficiency is low; the cost is high; and soft error tends to occur in the IC chip because the communication speed becomes high.

The problems involved in the conventional multiplex communication system will be explained in further detail hereinafter with reference to the attached drawings under DETAILED DESCRIPTION OF THE PREFERRED EMBODIMENTS.

SUMMARY OF THE INVENTION

With these problems in mind, therefore, it is the primary object of the present invention to provide a multiplex communication system suitable for use in an automotive vehicle, which can prevent erroneous operation due to noise, that is, can reliably discriminate data transmitted from the slave stations as being correct.

Further, it is another object of the present invention to provide a multiplex communication system high in response speed by reducing the number of slave stations to be accessed by the master station without changing the total numbers of the slave stations.

Further, it is the other object of the present invention is to provide a multiplex communication system high in transmission efficiency, low in communication speed, and low in manufacturing cost.

To achieve the above-mentioned first object, the present invention provides a multiplex communication system for transmitting and receiving data between a master station and a plurality of slave stations, comprising: (a) master communicating means (Y) disposed in the master station, for controlling data transmission and reception to and from each of the plural slave stations; (b) slave communicating means (Z) disposed in each of the plural slave stations, for controlling data transmission and reception to and from the master station; (c) logic means (X) disposed in the master station, for providing access to the slave stations one by one in sequence by transmitting a slave station access address and an instruction to the accessed slave station and receiving information data from the accessed slave station, to controllably activate loads of the slave stations on the basis of information data of the slave station; and (d) discriminating means (H) disposed in the master station, for collating specific information data transmitted from a slave station to improve signal transmission reliability. When the specific information data of the slave station is composed of at least two bits, said discriminating means discriminates specific information data as being correct only when all the bits transmitted from the slave station match in level those stored in the master station. When the specific information data is composed of at least three bits, said discriminating means discriminates specific information data as being correct only when the bits transmitted from the slave station match in level those stored in the master station on the basis of majority decision. Further, when said discriminating means transmits again an access signal to the slave station to receive again the specific information data for collation immediately after having received the specific information data transmitted from a slave station, said discriminating means discriminates the specific information data as being correct only when the first received information data matches in level the second received information data.

In the first aspect of the communication system according to the present invention, when the slave station transmits specific switch information data to the master station, since the master station can confirm the signal reliability by the discriminating means, it is possible to prevent erroneous operation due to noise.

To achieve the above-mentioned second object, the present invention provides a multiplex communication system, comprising: (a) key switch means for selecting one of power supply modes according to which loads and switches of the slave stations are classified; and (b) control means (c) for changing an access sequence from the master station to the slave stations according to power supply modes determined by position of said key switch means, to minimize the number of slave stations to be accessed by the master station for providing a higher response speed. The key switch means is an ignition key switch, and the power supply modes are a BAT mode obtained when the ignition key switch is set to the engine-off position, an ACC mode obtained when set to the accessory position with the engine off; and an IGN mode obtained when set to an engine-on position. Further, it is preferable that the system further comprises power supply means for selectively supplying power to only the slave stations to be accessed according to the selected power supply mode to minimize power consumption (dark current).

In the second aspect of the communication system according to the present invention, since the access sequence to the slave stations can be changed according to the power supply modes determined by the ignition key switch position, it is possible to minimize the number of slave stations to be accessed by the master station for providing a higher response speed.

To achieve the above-mentioned third object, the present invention provides a multiplex communication system such that the number of bits of data transmitted and received between the master station and the slave stations is adjusted according to the number of loads or switches included in each of the salve stations. The two types of bits are 8 and 16 bits.

In the third aspect of the communication system according to the present invention, since the number of bits is adjusted according to the number of loads (lamps, motors, etc.), it is possible to reduce the bit length of the communication protocol, improve the transmission efficiency, and reduce the cost.

BRIEF DESCRIPTION OF THE DRAWINGS

FIG. 1A is a schematic block diagram showing an example of basic multiplex communication system for an automotive vehicle;

FIG. 1B is a diagram for assistance in explaining a data sequence transmitted between the master and slave stations in the system shown in FIG. 1A;

FIGS. 2C-1 to 2C-3 are diagrams for assistance in explaining the access sequence from the master station to the slave station;

FIG. 3a and 3b are a schematic block diagrams showing another example of basic multiplex communication system for an automotive vehicle;

FIGS. 3B-1, 3B-2, 3B-3, are exemplary tables showing the basic relationship between the power supply (BAT, ACC and IGN) modes and the twenty slave stations including various switches and loads (lamps and motors);

FIG. 4A-1 is a basic schematic block diagram showing a second embodiment of the multiple communication system for automotive vehicle according to the present invention;

FIG. 4A-2 shows the relation of FIGS. 4a-2 and 4b-2;

FIGS. 4a-2 and 4b-2 are a more practical schematic block diagram showing the second embodiment according to the present invention;

FIGS. 4B-1, 4B-2, and 4B-3 are tables showing the improved relationship between the power supply (BAT, ACC and IGN) modes and the twenty slave stations including various switches and loads;

FIG. 5A is a diagram for assistance in explaining another data sequence transmitted between the master station and the slave stations in the conventional case;

FIG. 5B is a diagram for assistance in explaining the access sequence from the master station to the slave station in the conventional case;

FIG. 5C is a diagram showing the access sequence to the slave stations in the IGN mode according to the present invention;

FIG. 5D is a diagram showing the access sequence to the slave stations in the ACC mode according to the present invention;

FIG. 5E is a diagram showing the access sequence to the slave stations in the BAT mode according to the present invention;

FIG. 5F is a diagram showing the access sequence to the slave stations in the SLEEP mode according to the present invention;

FIG. 5G is a diagram showing the access sequence to the slave stations in the BAT mode in the conventional case;

FIG. 6 shows the relation of FIGS. 6a and 6b;

FIGS. 6a and 6b are more practical schematic block diagrams showing a modification of the second embodiment according to the present invention;

FIGS. 7B-a and 7B-b are more practical schematic block diagrams showing the third embodiment according to the present invention;

FIG. 8A is a diagram for assistance in explaining a data sequence of the present invention;

FIG. 8B is a table showing the relationship among the addresses, the slave station names, and the number of data bits according to the present invention; and FIG. 8C is a diagram for assistance in explaining a conventional data sequence.

DETAILED DESCRIPTION OF THE PREFERRED EMBODIMENTS

Figures 1, 1C:
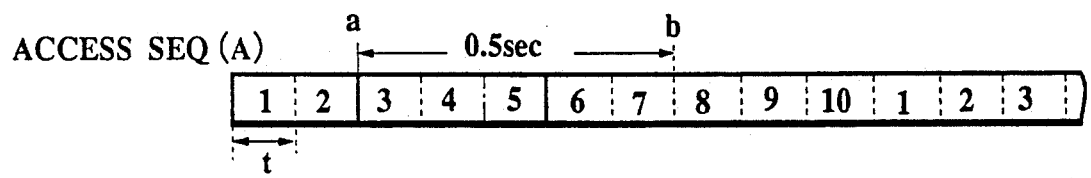
FIGS. 1C-1 to 1C-3 are diagrams for assistance in explaining the access sequence from the master station to the slave stations.

Prior to the description of the multiplex communication system according to the present invention, a first exemplary system configuration will be described hereinbelow with reference to FIGS. 1A, 1B and 1C-1 to 1C-3, which has already been proposed by the same applicants in Japanese Published Unexamined (Kokai) Pat. Appli. No. 3-136497 published Jun. 11, 1991. Further, this application was filed in the U.S. PTO on Oct. 22, 1990 and bears Ser. No. 07/601,949. This system is suitable for use as a multiplex communication system for an automotive vehicle.

FIG. 1A is a system block diagram which comprises a master station MS having a logic section X and a communication section Y and a plurality of slave stations SS1 to SS10 each having a communication section Z interconnected to the communication section Y of the master station MS via a multiplex transmission line ML. In FIG. 1A, the logic section X of the master station MS executes polling to the slave stations and collation of data transmitted by the slave stations. In more detail, the logic section X of the master station MS has cyclic access to the slave stations one by one in sequence by transmitting a slave station access address and an instruction to the accessed slave station where necessary and receiving information data from the accessed slave station to controllably activate loads of the slave station in response to switch information data of the slave station.

The slave stations SS are arranged so as to include lamps, motors and switches for an automotive vehicle, in which these lamps, motors and switches are so arranged as to roughly correspond to the practical arrangement positions of an automotive vehicle. In more detail, a first slave station SS1 is disposed at an operation lever provided at the steering handle column fixed at a right side driver seat, which includes a light switch, a turn lamp switch and a hazard lamp switch. A second slave station SS2 is disposed on the right side of the master station MS, which includes a power window (PW) assistant side (ASST) switch, a rear right (RR) side power window switch, a rear left (RL) side power window switch, and a door (DR) lock (LK) switch. A third slave switch SS3 is disposed on the front left side, which includes a left side head (HD) lamp (L) and a left side turn lamp(L). A fourth slave switch SS4 is disposed on the front right side, which includes a right side head lamp and a right side turn lamp. A fifth slave switch SS5 is disposed on the front left side, which includes a power window (PW) motor (MOT) for a front left side door and a door lock motor for the same door. A sixth slave station SS6 is disposed on the front right side, which includes a power window motor for a front right side door and a door lock motor for the same door. A seventh slave station SS7 is disposed on the rear left side, which includes a power window motor for the rear left side door and a door lock motor for the same door. An eighth slave station SS8 is disposed on the rear right side, which includes a power window motor for the rear right side door and a door lock motor for the same door. A ninth slave station SS9 is disposed on the rear left side, which includes a left side tail lamp and a left side turn lamp. A tenth slave station SS10 is disposed on the rear right side, which includes a right side tail lamp and a right side turn lamp.

FIG. 1B shows a bit sequence of data transmitted between the master station MS and the slave station SS. The data are composed of address bits A0 to A3 and data bits D0 to D7, whose total data transmit time is t. When an address is transmitted from the master station MS to the first or second slave stations SS1 or SS2, the slave station SS1 or SS2 returns data representing the current switch on-or-off conditions to the master station MS. On the other hand, when an address is transmitted from the master station MS to one of the slave stations SS3 to SS10, data for activating loads (lamp or motor) of the corresponding slave station are transmitted together with the address data. In other words, the slave station SS1 or SS2 transmits only switch information (condition) data to the master station MS in response to the address data. In response to the switch information data, the master station MS transmits load activating data to a slave station together with address data. The slave station SS1 or SS2 transmits only switch data to the master station MS, while the slave station SS3 to SS10 receives only load activating data from the master station MS.

With reference to FIGS. 1C-1 to 1C-3, the communication sequence from the master station MS to the slave stations SS1 to SS10 will be explained. In the conventional method, the master station MS calls the slave stations beginning from SS1 in sequence, that is, transmits a plurality of address data to the slave stations in sequence, in order to receive switch condition signals or to transmit load activating signals. Here, since a communication (access) time t (e.g. 0.1 sec) is required for each slave station, there exists such a long response time delay (e.g. 0.5 sec) from a time point a when the rear left power window switch (RL SW) is closed in the slave station SS2 to a time point b when the rear left (RL) power window motor begins to rotate in the slave station SS7, thus resulting in a response delay after the power window switch has been closed or depressed.

Figures 1, 1C, 2:
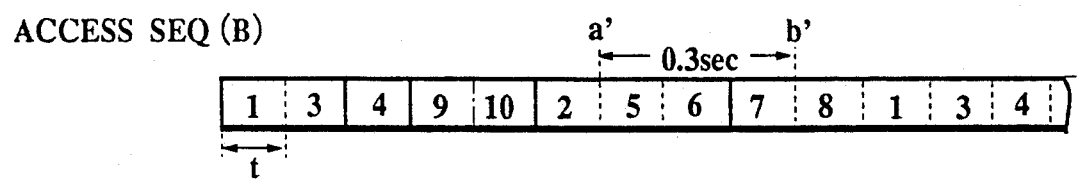
Figures 1, 1C, 2, 3:
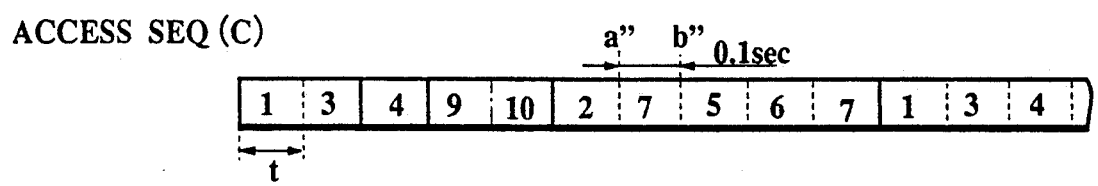

To overcome the above-mentioned problem, the applicants have already proposed by the above-mentioned Kokai application the following method; The access sequence (A) shown in FIG. 1C-1 is improved to that (B) shown in FIG. 1C-2 in such a way that all the power window motor activating slave stations SS5, SS6, SS7 and SS8 are accessed immediately after the power window switch including slave station SS2 has been accessed. In this method, it is possible to reduce the time delay from a time point a' when the rear left power window switch (RL SW) of the slave station SS2 is closed to a time point b' when the rear left power window motor of the slave station SS7 begins to rotate from 0.5 to 0.3 sec. When a further higher response speed is required, the access sequence (B) shown in FIG. 1C-2 is changed to that (C) shown in FIG. 1C-3, in such a way that any required power window motor actuating slave station SS7 corresponding to the power window switch depressed in the slave station SS2 can be accessed immediately after the slave station SS2 has been accessed. In this method, it is possible to reduce the time delay from a time point a" when the rear left power window switch (RL SW) of the slave station SS2 is closed to a time point b" when the rear left (RL) power window motor of the slave station SS7 begins to rotate, down to 0.1 sec.

In the above-mentioned multiplex communication system, however, since the switch on-off condition signals are read and checked or discriminated once in one access cycle to all the slave stations, that is, once for each cycle (1 sec =0.1 sec×10 slave stations), in case a reading error occurs due to noise for instance, there exists a problem in that the load such as motor or lamp is activated erroneously on the basis of erroneous data for 1 sec, until correct data transmitted by the slave station is received by the master station at the succeeding access cycle.

To eliminate the above-mentioned problem, a first embodiment of the multiplex communication system according to the present invention comprises in particular data discriminating means for collating data transmitted by the slave station to improve data reliability.

Figure 2A:
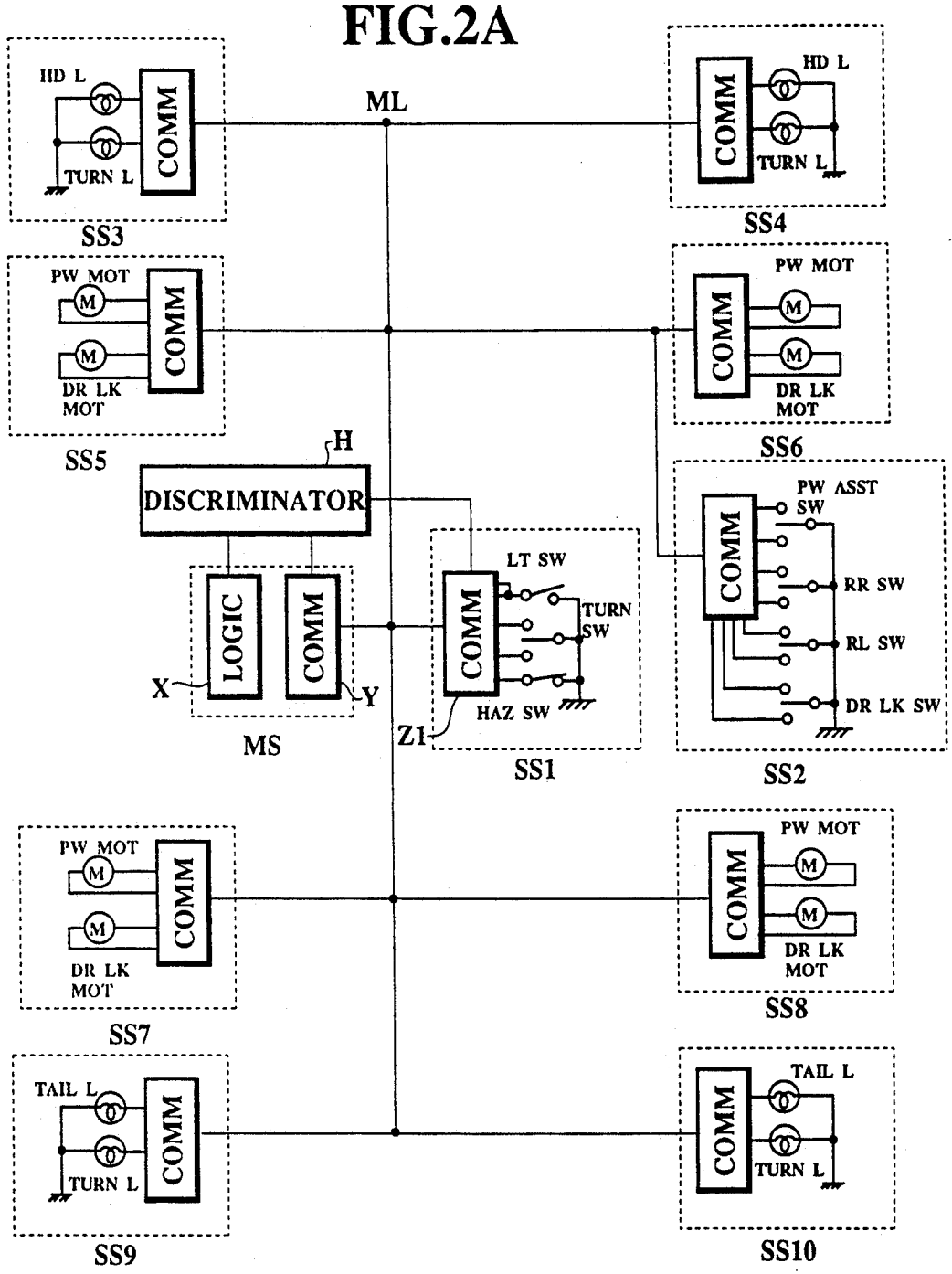
FIG. 2A is a schematic block diagram showing a first embodiment of the multiplex communication system for an automotive vehicle according to the present invention.

With reference to FIGS. 2A, 2B and 2C-1 to 2C-3 the first embodiment will be described hereinbelow. The system according to the present invention shown in FIG. 2A is the same as the exemplary system shown in FIG. 1A, except the system of this embodiment further comprises a data discriminator H. The data discriminator H is provided between the master station MS and the slave station SS1 for convenience. However, it is also possible to incorporate this discriminator H in the logic section X of the master station MS.

In this embodiment, data representing the light switch on-off conditions transmitted by the first slave station SS1 are determined as specific important switch signals, by way of example.

Figure 2B:
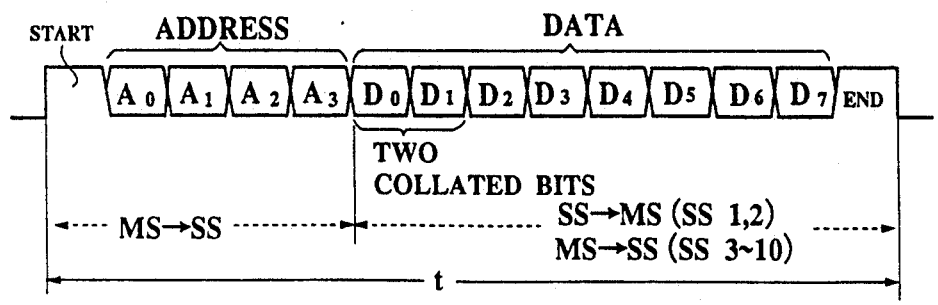
FIG. 2B is a diagram for assistance in explaining a data sequence transmitted between the master and slave stations in the system shown in FIG. 2A.

FIG. 2B shows a data bit sequence transmitted between the master station MS and the slave station SS1 in which A0 to A3 are allocated to an address of the slave station SS1; D0 and D1 are allocated to a light switch; D2 is allocated to a right turn switch; D3 is allocated to a left turn switch; D4 is allocated to a hazard lamp switch. That is, two successive bits D0 and D1 are allocated to the light switches of the first slave station SS1 so as to be collated or checked by the master station MS.

Figures 1, 2C:
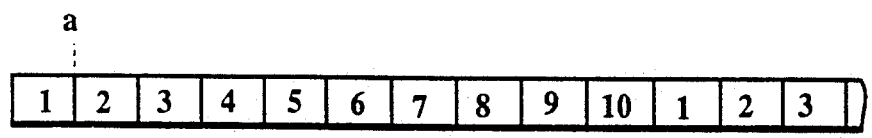
Figures 2, 2C:
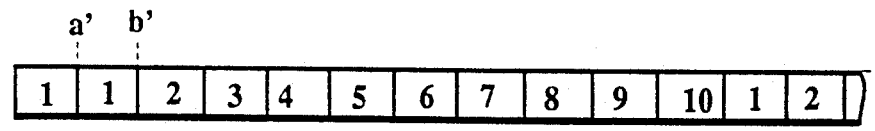
Figures 2, 2C, 3:
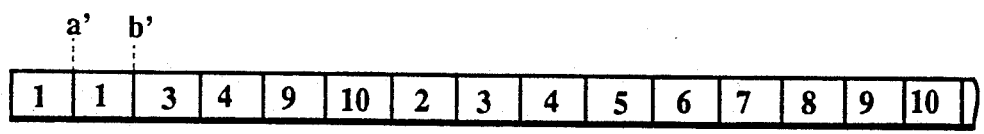

The operation of this embodiment will be explained hereinbelow with reference to FIGS. 2A, 2B and 2C.

When the driver turns on a light switch at night during travel to light up the head lamps, the slave station SS1 transmits a signal to the master station MS, since all the slave stations SS are cyclically accessed by the master station MS. In response to this signal, the master station MS transmits a sequence of data signals as shown in FIG. 2B to the first slave station SS1.

In FIG. 2B, A0 to A3 are allocated to an address indicative of the first slave station SS1, and D0 to D7 are allocated to data signals. In response to a sequence of these data, the first slave station SS1 returns two bit data signals D0 and D1 allocated to the light switch to the master station MS. The master station compares the returned bit data signals D0 and D1 with those stored in the discriminator with respect to the signal level. If both the signal levels match each other, the master station MS determines that these two signals indicate a light switch signal, and transmits a sequence of data including each address signal and each load activating signal to the two slave stations SS3 and SS4 to turn on the two head lamps and also to the two slave stations SS9 and SS10 to turn on the two tail lamps, respectively. That is, in response to these data signals, the slave stations SS3, SS4, SS9 and SS10 turn on the lamps and the tail lamps, respectively.

In this embodiment, since the specific important light switch signal is discriminated on the basis of the two bit data (D0 and D1) signals by the discriminator H, it is possible to easily discriminate a specific important signal as being correct by comparing the two returned bit signal levels with those stored in the discriminator H.

In the conventional method in which a single bit is allocated to the light switch, in case the master station MS cannot discriminate due to noise whether the light switch signal returned from the slave station is correct or not, the returned signal is confirmed again after the other slave stations SS2 to SS10 have been all accessed. Therefore, there exists a case where the head lamps are lit up after one access cycle (e.g. one second) has elapsed. In contrast, in the present invention, since the light switch signal can be immediately discriminated by the discriminator H on the basis of the two series-connected bit signals, the master station MS can discriminate a specific signal transmitted from the slave station without any delay.

Further, in the above embodiment, although two bit signals D0 and D1 are used, it is of course possible to use three or more bit signals for discrimination. In this case, the bit signal level match is determined, only when all the bit levels match each other, or the bit levels are determined as being matched on the basis of a majority decision.

As described above, when the master station MS has cyclic access to the slave stations SS, if a change in a switch in the slave station is detected, the main station MS gets an additional access to the corresponding slave station for data collation. Only when the checked data transmitted from the slave station matches those stored in the master station, does the master station MS determine the received data to be correct and transmit load actuating signals to the other slave stations, thus improving the data transmission reliability.

FIGS. 2C-1, 2C-2 and 2C-3 show the other slave station access methods. In the conventional access sequence (A) shown in FIG. 2C-1, the master station gets access to the slave stations SS beginning from SS1 in sequence in the numerical order, in which a denotes a time point when a specific slave station SS1 including an important switch is accessed. In the access sequence (B) shown in FIG. 2C-2, immediately after the discriminator H discriminates a change in the important switch of the specific slave station SS1 at the time point a', the discriminator H commands the master station MS to get an additional access to the slave station SS1 again and collates or compares the first data transmitted from the slave station SS1 at time point a' with the second data transmitted therefrom at time point b' to check the two bit (D0 and D1) match in level for collation. In the access sequence (C) shown in FIG. 2C-3, when the master station MS detects a change in the specific slave station SS1 at time point a', the master station MS has an access to the slave station SS1 again to collate the first data with the second data at point b', and further has access immediately to the corresponding load activating slave stations SS3, SS4, SS9 and SS10, in the same way as shown in FIG. 1C-3 to further improve the response speed.

As described above, in the multiplex transmission system according to the present invention, since the bit signals indicative of an important switch are discriminated as being correct on the basis of two or more bit signals in sequence, it is possible to improve the data transmission reliability from the slave station to the master station, while reducing the response speed of the switch depression to the load to be activated.

A second embodiment of the multiplex communication system according to the present invention will be described hereinbelow. The feature thereof is to classify the slave stations according to power supply modes, in order to improve the response speed and power consumption. In the case of the automotive vehicle, the power supply modes are determined according to ignition key switch position such as BAT (OFF) position at which the ignition key is set to engine-off position, ACC position at which the key is set to accessory position (an air conditioner is used at engine halt), and IGN (ON) position at which the key is set to engine-on position.

A second exemplary system configuration will be described hereinbelow with reference to FIGS. 3A, 3B-1 to 3B-3.

Figure 3A:
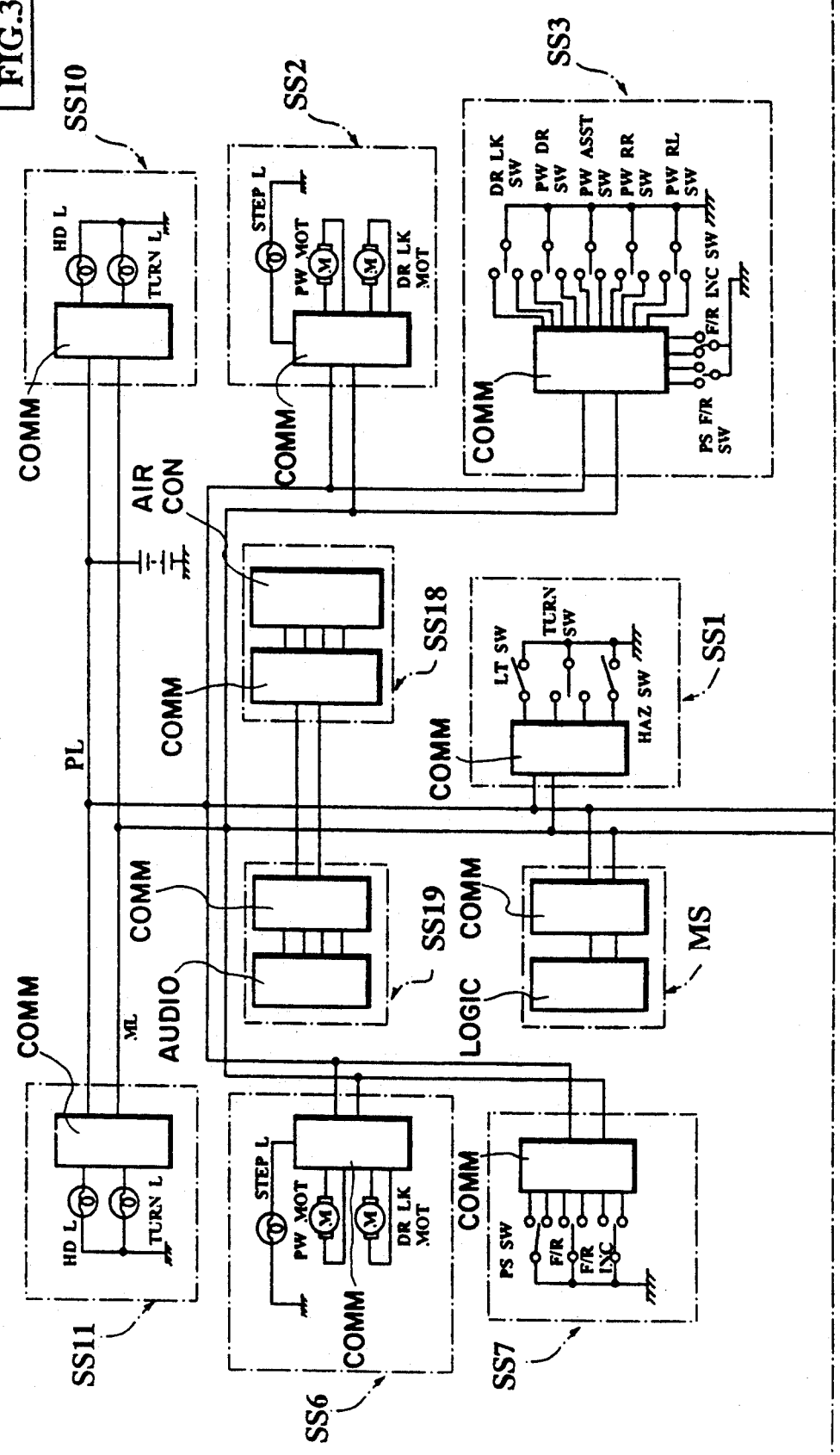
FIG. 3A shows the relation of FIGS. 3a and 3b.
Figure 3B:
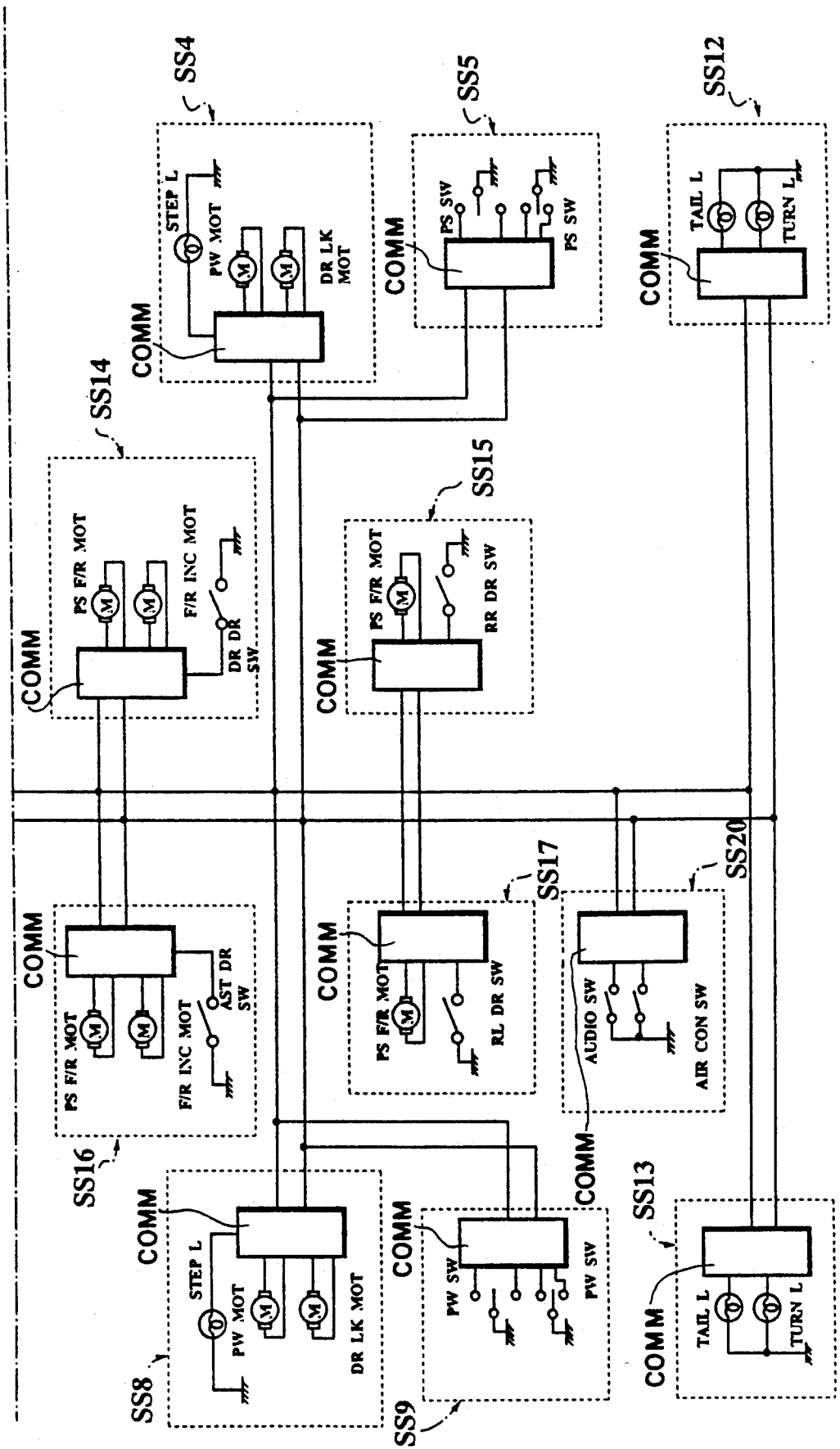

FIGS. 3a and 3b show a system block diagram which comprises a master station MS having a logic section and a communication section and a plurality of slave stations SS1 to SS20 each having a communication section interconnected to the communication section of the master station MS via a multiplex transmission line ML and a power supply line PL. The respective slave stations SS detect changes in switch on-off conditions and transmit the detected switch conditions to the master station MS, to drive or activate loads (lamps and motors) corresponding to the turned-on switches.

Further, in FIG. 3a, the PW DR SW denotes a switch for moving up and down a driver seat (front right) side power window; the PW ASST SW denotes a switch for moving up and down an assistant driver (front left) side power window; the PW RR SW denotes a switch for moving up and down a rear right side power window; and the PW RL SW denotes a switch for moving up and down a rear left side power window, respectively. Further, the PS F/R SW denotes a switch for shifting a power seat frontward or rearward; the F/R INC SW denotes a switch for inclining a power seat frontward or rearward.

The master station MS executes a polling operation in sequence to the respective slave stations on the basis of a multiplex communication data format as shown in FIGS. 5A and 5B. In more detail, the master station MS first transmits address bits (A0 to A7) of each slave station SS and on/off instructions (D0 to D15) of loads (e.g. lamps, motors) included in each slave station SS. Further, each slave station SS returns on/off information data (D16 to D31) of the switches inclined therein to the master station MS. As described above, the master station MS can control the respective loads included in the respective slave stations SS on the basis of switch information data transmitted from the respective slave stations by the above-mentioned polling operation (i.e. data are transmitted in sequence between the master and slave stations via a single common multiplex communication channel by time division multiplex data communications).

The master station MS can detect three modes of BAT (battery) mode, ACC (accessory) mode and IGN (ignition) mode according to the ignition key positions. In the BAT (OFF) mode, power is supplied to only the BAT system; in the ACC mode, power is supplied to both the BAT and ACC systems; and in the IGN mode, power is supplied to all the BAT, ACC and IGN systems for allowing communications between the master and slave stations. The BAT system includes various switches, various lamps and various motors; the ACC system includes an air conditioner, an audio apparatus, and switches corresponding thereto; and the IGN system includes various switches and various motors, all as listed in FIGS. 3B-1 to 3B-3.

In the above-mentioned system as shown in FIG. 3A, since a number of slave stations (as large as 20 stations) are included, if 4 msec is required for communication with to each slave station, it takes a time t as long as 80 msec to communicate all the slave stations as shown in FIG. 5B, thus resulting in a problem in that the system response speed is slow. To overcome this problem, there exists a method of getting access to only the necessary slave stations without having access to all the slave stations. That is, the slave stations to be accessed are changed according to the power supply modes (i.e. BAT, ACC and IGN modes determined by the ignition key switch positions). In this method, however, since loads and switches are inclined mechanically in the nearest possible slave stations, respectively in the system shown in FIG. 3A, where even a single load or switch to be activated in the BAT mode is included in the slave station, the master station MS must get access to these slave stations to be accessed in the BAT mode in any of the IGN, ACC and BAT modes, thus it takes a great deal of time for the polling operation.

For instance, if the six slave stations SS5, SS7, SS9, SS18, SS19 and SS20 (having switches and apparatus activated only in the IGN and ACC modes) are not accessed in the BAT mode, the remaining slave stations as much as 14 stations must be accessed, as shown in FIG. 5G, thus resulting in a problem in that the response speed is still low (tb=56 msec).

Figures 1, 4A:
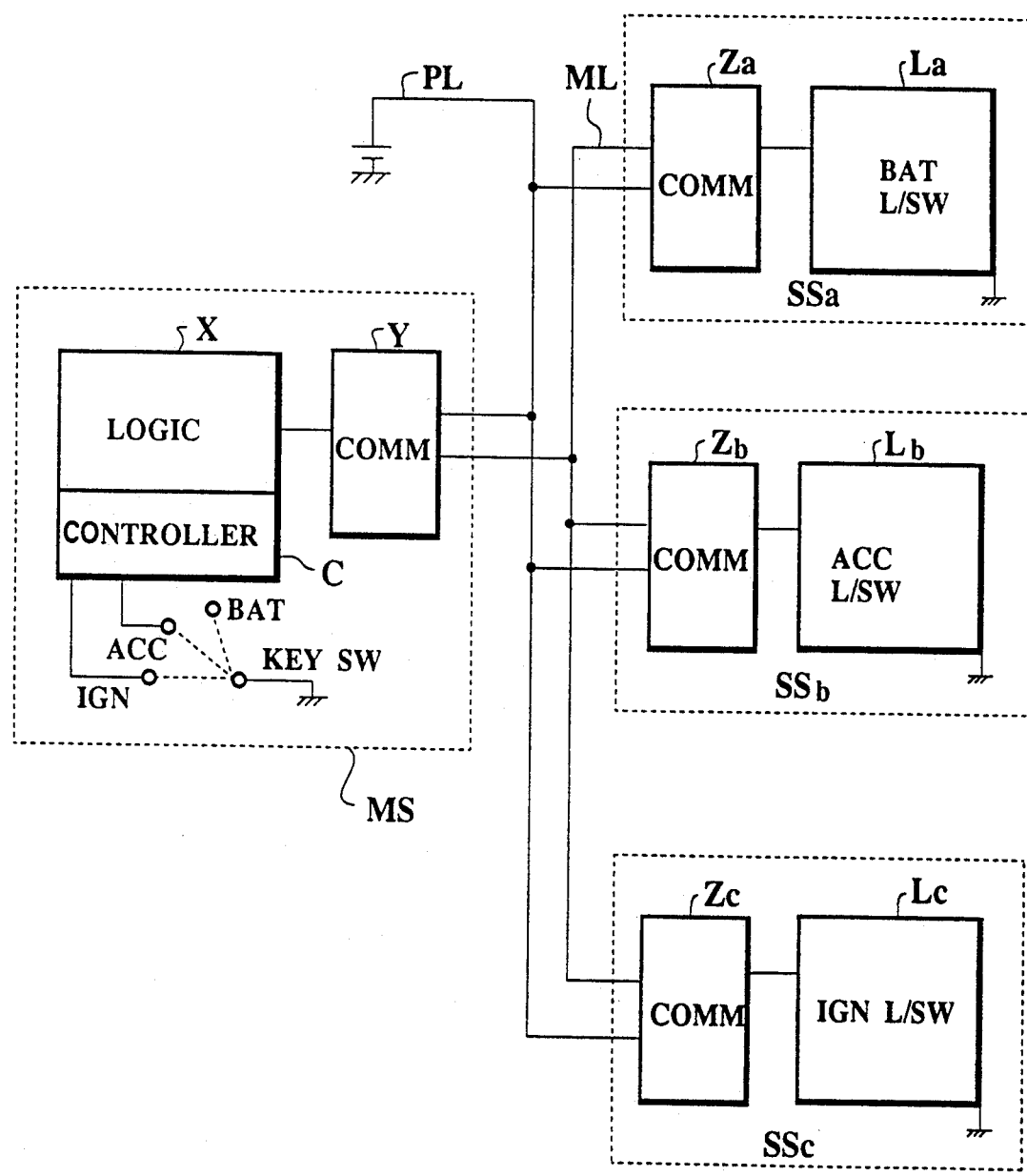

The second embodiment of the system according to the present invention will be described hereinbelow with reference to the attached drawings. In FIG. 4A-1, the master station MS comprises a logic section X for executing various calculations, a communication section Y for transmitting/receiving data signals, and a controller C for selecting slave stations according to the positions of a key switch (i.e. BAT (OFF) mode, ACC mode, and IGN (ON) mode). On the other hand, a plurality of slave stations SSa, SSb and SSc are connected to the master station MS via a power supply line PL and a multiple transmission line ML. The slave station SSa comprises a communication section Za and BAT-mode loads/switches La; the slave station SSb comprises a communication section Zb and ACC-mode loads/switches Lb; and the slave station SSc comprises a communication section Zc and IGN-mode loads/switches Lc, respectively so that loads/switches belonging to the same power supply modes are grouped together as a rule.

FIG. 4A-2, FIG. 4a-2 and FIB. 4b-2 show a more practical block diagram according to the second embodiment, which corresponds to the basic system shown in FIG. 3A. The difference between the systems shown in FIG. 3A and FIG. 4A-2 will be described hereinbelow with reference to the difference between the tables shown in FIGS. 3B-1 to 3B-3 and the tables shown in FIGS. 4B-1 to 4B-3. The feature of this second embodiment is to, construct the respective slave stations to be accessed on the basis of load/switches belonging to the same power supply system and to change the slave stations to be accessed according to the key switch positions (the power supply modes) by the controller C, in such a way that the access sequence to the slave stations can be rearranged as shown in FIGS. 5C, 5D, 5E and 5F. However, only the slave station SS1 includes both the BAT-mode light and hazard switches and the IGN-mode turn switch, under consideration of balance with other slave stations without increasing the number of slave stations.

Figures 2, 4B:
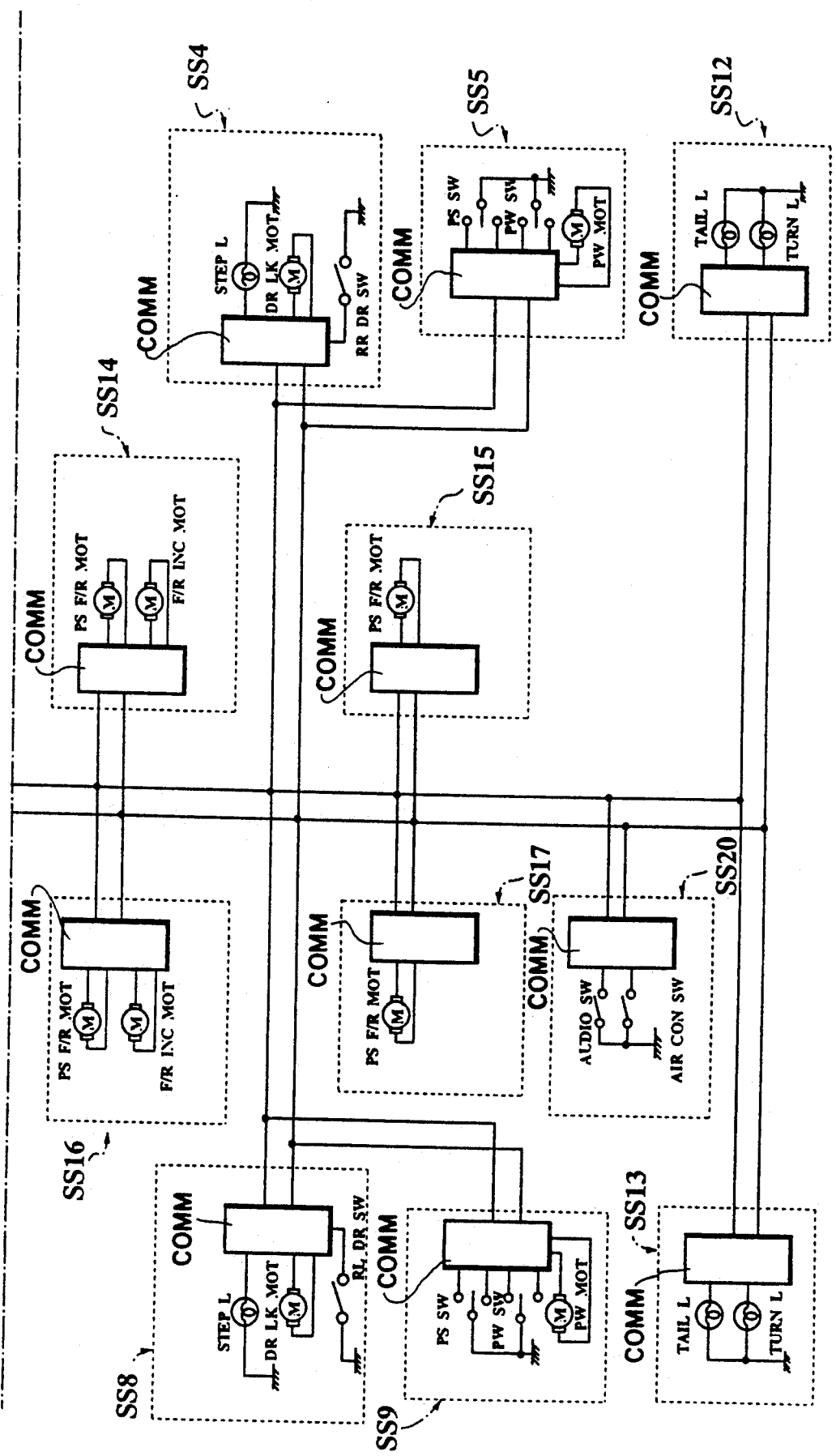

In the BAT mode, the door lock switch of SS3 and the DR door switch of SS14 (shown in FIGS. 3B-1 and 3B-2) are shifted to SS2 (shown in FIG. 4B-1). The RR door switch of SS15 (shown in FIG. 3B-2) is shifted to SS4 (shown in FIG. 4B-1). The AS door switch of SS16 (shown in FIG. 3B-2) is shifted to SS6 (shown in FIG. 4B-2). The RL door switch of SS17 (shown in FIG. 3B-3) is shifted to SS8 (shown in FIG. 4B-2). In the ACC mode, there exists no change. In the IGN mode, the power window motor of SS2 (shown in FIG. 3B-1) is shifted to SS3 (shown in FIG. 4B-1). The PW motor of SS4 (shown in FIG. 3B-1) is shifted to SS5 (shown in FIG. 4B-1). The PW motor of SS6 (shown in FIG. 3B-1) is shifted to SS7 (shown in FIG. 4B-2). The PW motor of SS8 (shown in FIG. 3B-2) is shifted to SS9 (shown in FIG. 4B-2).

Therefore, in FIGS. 5C to 5F, in the BAT mode, the 9 slave stations SS1, SS2, SS4, SS6, SS8, SS10, SS11, SS12 and SS13 are accessed in sequence (because slave stations SS3, SS5 SS7, SS9, and SS14–20 are not accessed) as shown in FIG. 5E, so that the access time can be reduced down to t'b (about 36 msec). In the ACC mode, since the slave stations related to the BAT and ACC modes are accessed, the 12 slave stations SS18 to SS20 are additionally accessed as shown in FIG. 5D, so that the access time can be reduced down to t'a (about 48 msec). Further, in the 1GN mode, all the 20 slave stations must be accessed, as shown in FIG. 5C, so that the access time cannot be reduced from t=t'i (about 80 msec).

Here, where no load/switch is being activated in the BAT mode, this mode is referred to as a SLEEP mode, and only the switches included in the five slave stations SS1, SS2, SS4, SS6 and SS8 are accessed (because SS10 to SS13 include no switch) as shown in FIG. 5F, so that the access time can be reduced down to t's (about 20 msec).

In summary, in the case of the system shown in FIG. 3A, the 14 slave stations are accessed in the BAT mode; the 17 slave stations are accessed in the ACC mode; the 20 slave stations are accessed in the IGN mode, and the 6 slave stations are accessed in the SLEEP mode. In contrast, in the case of the system shown in FIG. 4A-2, the 9 slave stations are accessed in the BAT mode; the 12 slave stations are accessed in the ACC mode; the 20 slave stations are accessed in the IGN mode; and the 5 slave stations are accessed in the SLEEP mode.

FIG. 6, FIG. 6a and FIG. 6b show a modification of the second embodiment, in which a power supply section including three different power control sections PC1, PC2 and PC3 connected to the logic section X is additionally incorporated in the system shown in FIG. 4A-2 so as to be controlled by the controller C of the master station MS. In this modification, no power is supplied to the slave stations not to be accessed in the ACC, BAT, SLEEP modes as shown in FIGS. 5D to 5F.

In more detail, power is always supplied to the 5 slave stations SS1, SS2, SS4, SS6, and SS8 required to be accessed in the SLEEP mode. Further, power is supplied to the other slave stations only where necessary via the three power control sections PC1 to PC3. That is, the first power control section PC1 supplies power to only the 8 slave stations SS3, SS5, SS7, SS9, SS14, SS15, SS16, and SS17 additionally required to be accessed in the IGN mode (all the slave stations must be accessed) via a first power supply line PL1; the second power control section PC2 supplies power to only the 3 slave stations SS18, SS19 and SS20 additionally required to be accessed only in the ACC mode via a second power supply line PL2; and the third power control section PC3 supplies power to only 4 slave stations SS10, SS11, SS12 and SS13 additionally required to be accessed only in the BAT mode via a third power supply line PL3.

In this modification, since power is supplied to only the necessary slave stations according to the power supply modes via the power control section, it is possible to economize battery power consumption in particular at the BAT and SLEEP mode, by minimizing the vehicle dark current.

As described above, in the second embodiment of the multiplex communication system according to the present invention, since the loads/switches distributed to the respective slave stations are classified according to the power supply modes (BAT, ACC, IGN), the minimum slave stations to be accessed by the master station are appropriately selected according to the power supply modes, so that it is possible to improve the response time of the system.

In addition, as power is supplied to only the minimum slave stations required for each power supply mode, via the power supply control sections, it is possible to minimize the battery power consumption in particular in the BAT and SLEEP modes.

The third embodiment of the multiple communication system according to the present invention will be described hereinbelow. The feature of this embodiment is to contract the format of the communication protocol by two or more kinds of bits (e.g. 8 and 16 bits) according to the number of switches and loads included in the respective slave stations.

In the exemplary multiplex communication systems as shown in FIGS. 1A and 3A, the format of the communication protocol is composed of 16 bits. Therefore, there exists a problem in that each item of communication data is long in bit length so that the transmission efficiency is low and the cost is high because ICs capable of handling a greater number of bits must be incorporated in the system. Further, since the communication speed is relatively high, the S/N ratio against radiant noise, in particular becomes low or soft error tends to occur in the IC chip.

Figure 7A:
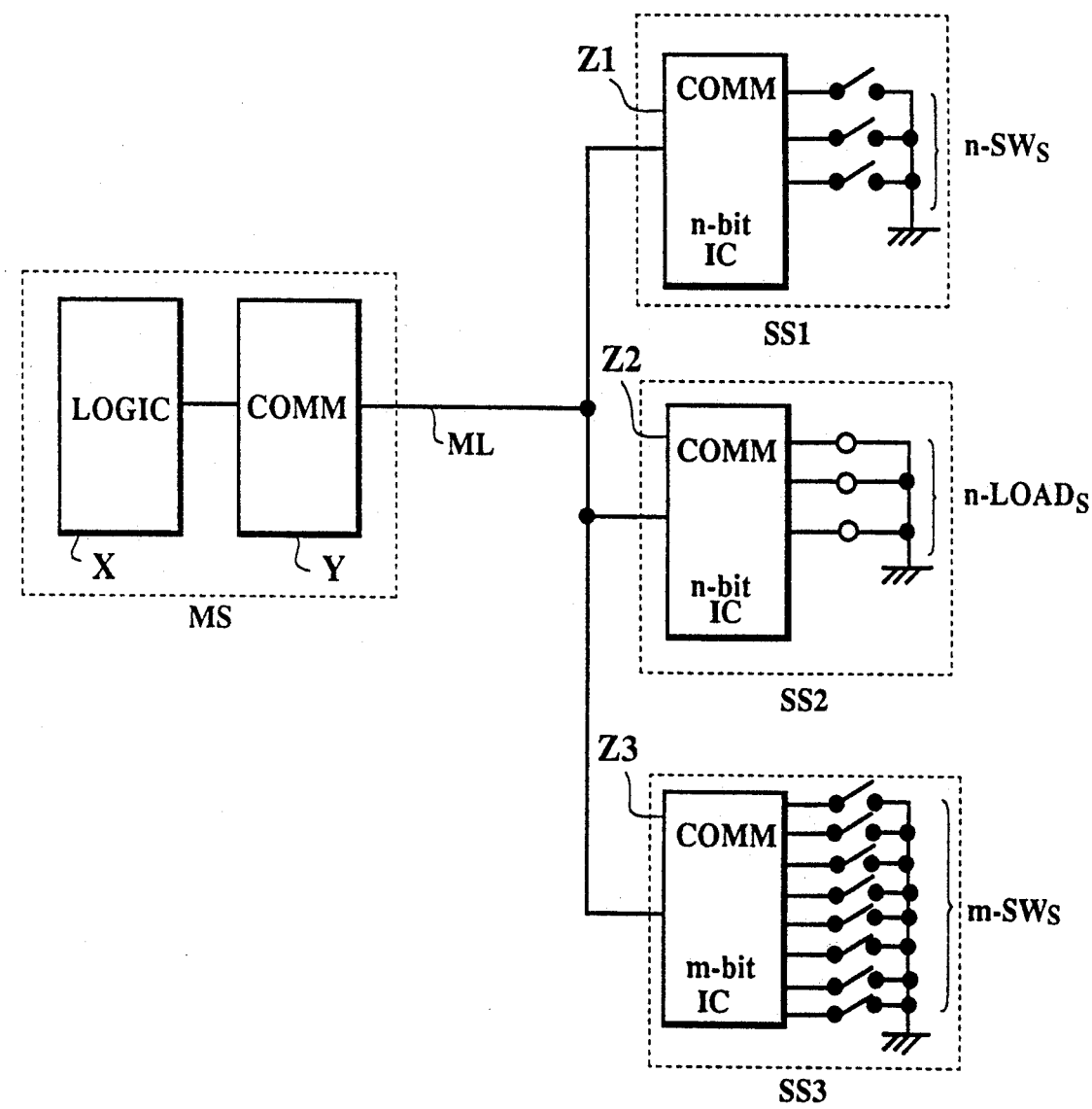
FIG. 7A is a basic schematic block diagram showing a third embodiment according to the present invention.

In FIG. 7A, the master station MS comprises a logic section X and a communication section Y and connected to three slave stations SS1, SS2 and SS3 via a multiplex transmission line ML. The first slave station SS1 includes a communication section Z1 having an n-bit IC and n switches. The second slave station SS2 includes a communication section having an n-bit IC and n loads (lamps and/or motors). The third slave station SS3 includes a communication section Z3 having a m-bit IC and m switches. In the above case, it is preferable that the number of bits is the same as that of the loads or switches. However, usually the number of bits is determined to be larger than that of the loads or switches.

FIG. 7B, FIG 7B-a and FIG. 7B-b show a block diagram showing a more practical example of the multiplex communication system for an automotive vehicle. The first slave station SS1 represented by a, combination switch includes 10 switches in total including a small light switch, a low beam (Lo) switch, a high beam (Hi) switch, a passing light switch, an automatic head light dimmer switch, a hazard switch, a washer switch, and an oil filmless washer switch, so that the communication section Z1 includes a 16/16 bit IC. The second slave station SS2 represented by a power window switch includes 8 switches in total including a power window (PW) assistant side (ASST) switch, a PW rear right (RR) side switch, a PW rear left (RL) side switch, and a door lock switch, so that the communication section Z2 includes an 8/8 bit IC. The third slave station SS3 represented by a left head lamp includes 9 loads in total including a high beam lamp, a low beam lamp, a fog light, a front turning lamp, a side turning lamp, a cornering lamp, a washer motor, and an oil filmless washer motor, so that the communication section Z3 includes a 16/16 bit IC. The fourth slave station SS4 represented by a right head lamp includes 7 loads in total including a high beam lamp, a low beam lamp, a fog lamp, a horn, a front turning lamp, a side turning lamp, and a cornering lamp, so that the communication section includes an 8/8 bit IC. The fifth slave station SS5 represented by a PW assist (ASST) motor includes 4 loads of a PW motor and a door lock motor, so that the communication section Z5 includes an 8/8 bit IC.

The sixth, seventh and eighth slave stations SS6, SS7 and SS8 are the same as the fifth slave station, SS5. The ninth slave station SS9 includes 2 loads including a tail lamp and a turn lamp, so that the communication section Z9 includes an 8/8 bit IC. The tenth slave station SS10 is the same as the ninth station SS9. The eleventh slave station SS11 includes 5 switches including an ignition key switch, a door switch, a parking switch, an inhibitor switch, and a door switch, so that the communication section Z11 includes an 8/8 bit IC.

Further, the 16/16 bit and 8/8 bit are the numbers of bits used for general-purpose ICs. However, the numbers of the bits are not necessarily limited to 8 or 16 bits. Further, a pair having a lines A and B of symmetrical arrangement are used as the multiplex transmission line ML to transmit data via one of lines when the other is in trouble.

The operation of the embodiment will be described hereinbelow with reference to FIGS. 8A 8B and 8C.

FIG. 8A shows a communication data format, according to the invention, which is indicative of an access method to a slave station and a data length, in which HEAD indicates a header signal; ADS1 indicates a first slave station address; RX indicates a received (switch on-off) signal of 16 bits in the case of the first slave station; and TX denotes a transmitted (load activating) signal of 16 bits in the case of the first slave station. Further, in the case of the second slave station, RX and TX are both 8 bits. In the case of the third slave station, RX and TX are both 16 bits., FIG. 8B is a table, according to the invention showing the relationship among, the address 1, 2, 3, 4, 5—; the slave station names of the combination switch, PW DR, head lamp L, head lamp R, PW ASST; and numbers of bits. Further, FIG. 8C shows the conventional communication data format for comparison.

The master station MS continuously transmits and receives a series of data as shown in FIG. 8A to detect whether a switch is turned on in any one of the slave stations, and transmits a signal to the slave station to activate a load corresponding to the turned-on switch.

In the communication data format of the present invention, since the number of bits is adjusted to 8/8 or 16/16 bits according to the respective slave stations under consideration of the number of switches or loads (lamps and/or motors), it is possible to reduce the total bit length of the communication protocol as shown in FIG. 8A, so that the transmission efficiency can be improved markedly without increasing the communication speed and therefore the S/N ratio for radiant noise (IC soft error) can be improved.

In addition, since the wasteful input/output terminals of an IC can be omitted and additionally LSI registers can be used in common owing to the symmetrical construction of 8- and 16-bit data signals, it is possible to reduce the cost of the multiple communication system.

As described above, in the multiple communication system according to the present invention, since the data signals to be transferred between the master station and the slave stations are constructed of at least two kinds of bits (8 or 16 bits) according to the number of switches and loads, it is possible to reduce the data length of the communication protocol, increase the transmission efficiency, reduce the communication speed, and therefore reduce the system cost.

What is claimed is:

1. A multiplex communication system for transmitting and receiving data between a master station and a plurality of slave stations, comprising:
   (a) master communicating means, disposed in said master station, for controlling data transmission and reception to and from each of said slave stations;
   (b) slave communicating means, including switches disposed in each of said slave stations, for controlling data transmission and reception to and from said master station;
   (c) logic means, disposed in said master station, for accessing said slave stations cyclically one by one in sequence by transmitting a slave station access address an instruction to an accessed slave station and receiving information data from said accessed slave station, to controllably activate loads of said slave stations on the basis of information data concerning said slave stations; and
   (d) discriminating means, disposed in said master station, for collating switch address data transmitted from a slave station with data stored therein to improve transmission reliability, wherein immediately after having received the switch address data transmitted from a slave station, said discriminating means transmits again an access address to the slave station to receive again the switch address data for collation of the switch address data, and said discriminating means discriminates the switch address data as being correct, only when first received switch address data matches in level with second received switch address data.

2. A multiplex communication system for transmitting and receiving data between a master station and a plurality of slave stations, comprising:
   (a) master communicating means, disposed in said master station, for controlling data transmission and reception to and from each of said slave stations;
   (b) slave communicating means, including switches disposed in each of said slave stations, for controlling data transmission and reception to and from said master station;
   (c) logic means, disposed in said master station, for accessing said slave stations cyclically one by one in sequence by transmitting a slave station access address an instruction to an accessed slave station and receiving information data from said accessed slave station, to controllably activate loads of said slave stations on the basis of information data concerning said slave stations;
   (d) discriminating means, disposed in said master station, for collating switch address data transmitted from a slave station with data stored therein to improve transmission reliability;
   (e) key switch means for selecting one of plural power supply modes according to which loads and switches of said slave stations are classified; and
   (f) control means for changing an access sequence from said master station to said slave stations, according to power supply modes determined by a position of said key switch means, to minimize the number of said slave stations to be accessed by said master station for providing a higher response speed.

3. The multiplex communication system of claim 2, wherein said key switch means is an ignition key switch, and said power supply modes are a BAT mode obtained when an ignition key switch is set to an engine-off position, an ACC mode obtained when said ignition key switch is set to an accessory position at engine halt; and an IGN mode obtained when said ignition key switch is set to an engine-on position.

4. The multiplex communication system of claim 2, which further comprises power supply means for selectively supplying power to only slave stations to be accessed according to a selected power supply mode.

5. A multiplex communication system for transmitting and receiving data between a master station and a plurality of slave stations, comprising:
- (a) master communicating means, disposed in the master station, for controlling data transmission and reception to and from each of the slave stations;
- (b) slave communicating means, including switches disposed in each of said slave stations, for controlling data transmission and reception to and from said master station;
- (c) logic means, disposed in said master station, for accessing said slave stations cyclically one by one in sequence by transmitting a slave station access address an instruction to an accessed slave station and receiving information data from the accessed slave station, to controllably activate loads of the slave stations on the basis of information data concerning the slave stations;
- (d) discriminating means, disposed in said master station, for collating switch address data transmitted from a slave station with data stored therein, to improve transmission reliability; wherein immediately after having received the switch address data transmitted from a slave station, said discriminating means transmits again an access address to the slave station to receive again the switch address data for collation of the switch address data, and said discriminating means discriminates the switch address data as being correct, only when the first received switch address data matches in level with the second received switch address data;
- (e) key switch means for selecting one of plural power supply modes according to which loads and switches of the slave stations are classified; and
- (f) control means for changing an access sequence from the master station to said slave stations, according to power supply modes determined by a position of said key switch means, to minimize the number of said slave stations to be accessed by the master station for providing a higher response speed.

* * * * *